(12) United States Patent
Tamir et al.

(10) Patent No.: US 10,628,585 B2
(45) Date of Patent: *Apr. 21, 2020

(54) RANSOMWARE RESILIENT DATABASES

(71) Applicant: Microsoft Technology Licensing, LLC, Redmond, WA (US)

(72) Inventors: Gal Tamir, St. Avichayil (IL); Elad Iwanir, Metar (IL); Avi Ben-Menahem, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/491,525

(22) Filed: Apr. 19, 2017

(65) Prior Publication Data

US 2018/0211039 A1 Jul. 26, 2018

Related U.S. Application Data

(60) Provisional application No. 62/449,367, filed on Jan. 23, 2017.

(51) Int. Cl.
*G06F 21/56* (2013.01)
*G06F 16/11* (2019.01)
*G06F 11/20* (2006.01)

(52) U.S. Cl.
CPC ........ *G06F 21/566* (2013.01); *G06F 11/2053* (2013.01); *G06F 16/128* (2019.01); *G06F 21/568* (2013.01)

(58) Field of Classification Search
CPC .... G06F 21/566; G06F 21/568; G06F 21/552; G06F 15/18; G06F 21/562; G06F 11/1448
See application file for complete search history.

(56) References Cited

U.S. PATENT DOCUMENTS 8,555,385 B1   10/2013   Bhatkar et al.
8,769,684 B2    7/2014   Stolfo et al.
(Continued)

FOREIGN PATENT DOCUMENTS

EP    2570955 A1    3/2013
EP    3038003 A1    6/2016
(Continued)

OTHER PUBLICATIONS

"International Search Report and Written Opinion Issued in PCT Application No. PCT/US2017/067450", dated Mar. 28, 2018, 11 Pages.
(Continued)

*Primary Examiner* — Paul E Callahan
(74) *Attorney, Agent, or Firm* — Workman Nydegger

(57) ABSTRACT

A system for protecting a database against a ransomware attack includes a database backup handler configured to selectively output database backup data associated with a database to a storage device. A ransomware detector is configured to monitor changes to the database and to detect data changes to the database resulting from a ransomware attack. A ransomware remediator communicates with the ransomware detector and the database backup handler and is configured to restore data in the database to a point prior to the ransomware attack based upon the backup data in the storage device.

22 Claims, 8 Drawing Sheets

(56) References Cited

U.S. PATENT DOCUMENTS

| | | | |
|---|---|---|---|
| 8,856,542 | B2 | 10/2014 | Tatarinov et al. |
| 8,918,878 | B2 | 12/2014 | NiemelÄ |
| 9,152,789 | B2 | 10/2015 | Natarajan et al. |
| 9,189,629 | B1 | 11/2015 | Nachenburg et al. |
| 9,262,296 | B1 | 2/2016 | Soeder et al. |
| 9,317,686 | B1 | 4/2016 | Ye et al. |
| 9,514,309 | B1* | 12/2016 | Mann .................. G06F 21/60 |
| 9,535,932 | B1* | 1/2017 | DeSantis ........... G06F 17/30289 |
| 9,578,044 | B1 | 2/2017 | Sharma et al. |
| 9,602,536 | B1 | 3/2017 | Brown et al. |
| 9,679,134 | B1 | 6/2017 | Jing et al. |
| 9,838,405 | B1 | 12/2017 | Guo et al. |
| 9,852,289 | B1 | 12/2017 | Mann |
| 9,860,208 | B1 | 1/2018 | Ettema et al. |
| 9,860,261 | B2 | 1/2018 | Halfon et al. |
| 9,888,032 | B2* | 2/2018 | Dekel .................. H04L 63/145 |
| 9,990,511 | B1 | 6/2018 | Dreyfus |
| 10,007,795 | B1 | 6/2018 | Chung et al. |
| 10,009,360 | B1 | 6/2018 | Todd et al. |
| 10,032,033 | B2 | 7/2018 | Gu et al. |
| 10,055,582 | B1* | 8/2018 | Weaver ................. G06F 21/552 |
| 10,063,654 | B2 | 8/2018 | Kirti et al. |
| 10,122,752 | B1 | 11/2018 | Soman et al. |
| 10,262,137 | B1 | 4/2019 | Hart et al. |
| 2002/0174349 | A1 | 11/2002 | Wolff et al. |
| 2003/0023866 | A1 | 1/2003 | Hinchliffe et al. |
| 2005/0108568 | A1 | 5/2005 | Bussiere et al. |
| 2006/0031940 | A1 | 2/2006 | Rozman et al. |
| 2008/0086638 | A1 | 4/2008 | Mather |
| 2008/0141374 | A1 | 6/2008 | Sidiroglou et al. |
| 2008/0148403 | A1 | 6/2008 | Manion et al. |
| 2008/0196104 | A1 | 8/2008 | Tuvell et al. |
| 2008/0263669 | A1* | 10/2008 | Alme ..................... G06F 21/56 726/24 |
| 2009/0328216 | A1 | 12/2009 | Rafalovich et al. |
| 2011/0047620 | A1 | 2/2011 | Mahaffey et al. |
| 2011/0219450 | A1 | 9/2011 | Mcdougal et al. |
| 2012/0066765 | A1 | 3/2012 | O'brien |
| 2012/0151046 | A1 | 6/2012 | Weiss et al. |
| 2013/0067576 | A1 | 3/2013 | Niemela |
| 2013/0091570 | A1 | 4/2013 | Mccorkendale et al. |
| 2013/0160124 | A1 | 6/2013 | St Hlberg et al. |
| 2013/0263226 | A1 | 10/2013 | Sudia |
| 2014/0130164 | A1 | 5/2014 | Cafasso et al. |
| 2014/0181971 | A1 | 6/2014 | Tatarinov et al. |
| 2014/0298468 | A1 | 10/2014 | Yamamura et al. |
| 2014/0310246 | A1* | 10/2014 | Vijayan ............... G06F 11/1469 707/679 |
| 2014/0373153 | A1 | 12/2014 | Niemela |
| 2015/0163121 | A1 | 6/2015 | Mahaffey et al. |
| 2015/0172304 | A1 | 6/2015 | Kleczynski |
| 2015/0172311 | A1 | 6/2015 | Freedman et al. |
| 2015/0235177 | A1 | 8/2015 | Shraim et al. |
| 2015/0347768 | A1 | 12/2015 | Martin et al. |
| 2015/0381637 | A1 | 12/2015 | Raff et al. |
| 2016/0065594 | A1 | 3/2016 | Srivastava et al. |
| 2016/0077923 | A1* | 3/2016 | Zhang ................. G06F 11/1456 707/645 |
| 2016/0092684 | A1 | 3/2016 | Langton et al. |
| 2016/0127388 | A1 | 5/2016 | Cabot et al. |
| 2016/0149931 | A1 | 5/2016 | Ramos et al. |
| 2016/0162886 | A1 | 6/2016 | Howe |
| 2016/0164894 | A1 | 6/2016 | Zeitlin et al. |
| 2016/0180087 | A1 | 6/2016 | Edwards et al. |
| 2016/0188880 | A1 | 6/2016 | Smith et al. |
| 2016/0253498 | A1 | 9/2016 | Valencia et al. |
| 2016/0261621 | A1 | 9/2016 | Srivastava et al. |
| 2016/0300227 | A1 | 10/2016 | Subhedar et al. |
| 2016/0308898 | A1 | 10/2016 | Teeple et al. |
| 2016/0323316 | A1 | 11/2016 | Kolton et al. |
| 2016/0337390 | A1 | 11/2016 | Sridhara et al. |
| 2016/0344749 | A1 | 11/2016 | Mcalear |
| 2016/0378988 | A1 | 12/2016 | Bhashkar et al. |
| 2017/0034189 | A1 | 2/2017 | Powell |
| 2017/0063930 | A1 | 3/2017 | Chesla |
| 2017/0076096 | A1 | 3/2017 | Challener et al. |
| 2017/0091453 | A1 | 3/2017 | Cochin |
| 2017/0093886 | A1 | 3/2017 | Ovcharik et al. |
| 2017/0134405 | A1 | 5/2017 | Ahmadzadeh et al. |
| 2017/0140156 | A1 | 5/2017 | Gu et al. |
| 2017/0149825 | A1 | 5/2017 | Gukal et al. |
| 2017/0161495 | A1 | 6/2017 | Viswanath et al. |
| 2017/0163682 | A1 | 6/2017 | Yu |
| 2017/0177627 | A1 | 6/2017 | Singh et al. |
| 2017/0177867 | A1 | 6/2017 | Crofton et al. |
| 2017/0180394 | A1 | 6/2017 | Crofton et al. |
| 2017/0223031 | A1 | 8/2017 | Gu et al. |
| 2017/0244672 | A1 | 8/2017 | Shulman et al. |
| 2017/0250998 | A1 | 8/2017 | Miliefsky et al. |
| 2017/0257397 | A1* | 9/2017 | Graham .................. H04L 63/10 |
| 2017/0264619 | A1 | 9/2017 | Narayanaswamy et al. |
| 2017/0270293 | A1 | 9/2017 | Gu et al. |
| 2017/0279822 | A1 | 9/2017 | Lord et al. |
| 2017/0289184 | A1 | 10/2017 | C et al. |
| 2017/0302683 | A1 | 10/2017 | Kawauchi et al. |
| 2017/0308711 | A1 | 10/2017 | Barak |
| 2017/0310705 | A1 | 10/2017 | Gopalakrishna et al. |
| 2017/0310706 | A1 | 10/2017 | Wu et al. |
| 2017/0324755 | A1 | 11/2017 | Dekel et al. |
| 2017/0329783 | A1 | 11/2017 | Singh et al. |
| 2017/0359370 | A1 | 12/2017 | Humphries et al. |
| 2017/0364576 | A1 | 12/2017 | Chesla et al. |
| 2017/0364681 | A1 | 12/2017 | Roguine et al. |
| 2017/0366563 | A1 | 12/2017 | Volfman et al. |
| 2018/0004939 | A1 | 1/2018 | Kawakita |
| 2018/0007069 | A1 | 1/2018 | Hunt et al. |
| 2018/0007074 | A1 | 1/2018 | Kune et al. |
| 2018/0013681 | A1 | 1/2018 | Kohout et al. |
| 2018/0018458 | A1 | 1/2018 | Schmugar et al. |
| 2018/0018459 | A1 | 1/2018 | Zhang et al. |
| 2018/0020013 | A1 | 1/2018 | Yoshikawa et al. |
| 2018/0024893 | A1* | 1/2018 | Sella .................. G06F 11/1458 |
| 2018/0034835 | A1 | 2/2018 | Iwanir et al. |
| 2018/0046800 | A1 | 2/2018 | Aoki et al. |
| 2018/0211038 | A1 | 7/2018 | Breiman et al. |
| 2018/0225230 | A1 | 8/2018 | Litichever et al. |
| 2018/0293377 | A1 | 10/2018 | Tomonaga |

FOREIGN PATENT DOCUMENTS

| | | |
|---|---|---|
| EP | 3107024 A1 | 12/2016 |
| WO | 2018020362 A1 | 2/2018 |

OTHER PUBLICATIONS

"Protect yourself against encryption-based ransomware", https://web-beta.archive.org/web/20160620200619/https:/www.synology.com/en-global/solution/ransomware, Published on: Jun. 20, 2016, 6 pages.

"The end of Ransomware", https://web-beta.archive.org/web/20161130034554/https:/www.sophos.com/Ip/ransomware.aspx, Published on: Nov. 30, 2016, 3 pages.

Rosenquist, Matthew, "Cerber Ransomware Now Hunts for Databases", https://securingtomorrow.mcafee.com/mcafee-labs/cerber-ransomware-now-hunts-databases/, Published on: Nov. 4, 2016, 5 pages.

"Analytics for Ransomware", Retrieved from http://www.exabeam.com/wp-content/uploads/2016/06/Exabeam_Ransomware_DS.pdf, Retrieved on: Oct. 19, 2016, 2 pages.

"Exabeam Adds Ransomware Detection Capabilities to its Security Intelligence Platform", Retrieved from http://www.exabeam.com/pr/exabeam-adds-ransomware-detection-capabilities-security-intelligence-platform/, Jun. 13, 2016, 2 Pages.

"Kaspersky Lab", Retrieved from https://web.archive.org/web/20161107222144/https://www.kaspersky.com/about, Nov. 7, 2016, 5 Pages.

"My Files Were Corrupted or Renamed by Ransomware. What can I do?", Retrieved from https://web.archive.org/web/20181009123347/https://www.dropbox.com/help/security/ransomware-recovery, Oct. 21, 2016, 4 Pages.

(56) References Cited

OTHER PUBLICATIONS

"Final Office Action Issued in U.S. Appl. No. 15/375,001", dated Dec. 13, 2018, 25 Pages.

"Non Final Office Action Issued in U.S. Appl. No. 15/375,001", dated Aug. 10, 2018, 27 Pages.

Abade, Igor, "Ransomware and OneDrive", Retrieved from http://www.tshooter.com.br/en/2016/07/18/ransomware-and-onedrive/, Jul. 18, 2016, 6 Pages.

Ahmadian, et al., "Connection-Monitor & Connection-Breaker: A Nove Approach for Prevention and Detection of High Survivable Ransomwares", In Proceedings of the 12th International Iranian Society of Cryptology Conference on Information Security and Cryptology, Sep. 8, 2015, 7 Pages.

Nagpal, et al., "CATCH: Comparison and Analysis of Tools Covering Honeypots", In Proceedings of the 2015 International Conference on Advances in Computer Engineering and Applications, Mar. 19, 2015, pp. 783-786.

Crump, George, "Recovering from Ransomware Starts with Data Protection Strategy", Retrieved from https://web.archive.org/web/20160724010550/https://searchdatabackup.techtarget.com/tip/Recovering-from-ransomware-starts-with-data-protection-strategy, Jul. 2016, 5 Pages.

"Final Office Action Issued in U.S. Appl. No. 15/830,692", dated May 24, 2019, 16 Pages.

Hsu, et al., "A Practical Guide to Support Vector Classification", In Proceedings of the Technical Report, Dept. of Computer Science and Information Engineering, 2003, 16 Pages.

"International Search Report and Written Opinion Issued in PCT Application No. PCT/US2018/014657", dated May 4, 2018, 8 Pages.

Platt, J., "Sequential Minimal Optimization: A Fast Algorithm for Training Support Vector Mechanisms", Retrieved from: http://research.microsoft.com/pubs/69644/tr-98-14.pdf, Apr. 21, 1998, 21 Pages.

"Final Office Action Issued in U.S. Appl. No. 15/375,001", dated Oct. 25, 2019, 26 Pages.

"Non Final Office Action Issued in U.S. Appl. No. 15/375,001", dated Jul. 3, 2019, 26 Pages.

\* cited by examiner

RANSOMWARE RESILIENT DATABASES

CROSS-REFERENCE TO RELATED APPLICATIONS

This application claims the benefit of U.S. Provisional Application No. 62/449,367, filed Jan. 23, 2017. The entire disclosure of the application referenced above is incorporated by reference.

FIELD

The present disclosure relates to computer systems and methods for detecting and remediating database data adversely affected by ransomware.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Ransomware is malware that is used to deny access to computer files or other data on a computer. A ransom payment is requested in return for allowing access to the computer files or data. For example, ransomware may be used to encrypt the computer files or data. A key for decrypting the files or data is sent after the ransom payment is received. Ransomware may be installed on computers via Trojan horses, which are malware files that are disguised as legitimate files or programs. If the ransom payment is paid but the ransomware is not removed from the computer, the ransomware may repeat the process of encrypting files or data and demanding a ransom payment. For example, an email with an attachment including a malicious macro may be sent to a potential ransomware victim. When the user opens the attachment, the macro installs the ransomware on the computer.

SUMMARY

A system for protecting a database against a ransomware attack includes a database backup handler configured to selectively output database backup data associated with a database to a storage device. A ransomware detector is configured to monitor changes to the database and to detect data changes to the database resulting from a ransomware attack. A ransomware remediator communicates with the ransomware detector and the database backup handler and is configured to restore data in the database to a point prior to the ransomware attack based upon the backup data in the storage device.

In other features, the ransomware detector includes an event data handler in communication with the database that is configured to receive database events from the database. A rule-based detector is configured to receive an output of the event data handler and to use a plurality of rules to detect the ransomware attack and generate a ransomware alert.

In other features, the ransomware detector further includes an analytics detector configured to receive the output of the event handler, to detect the ransomware attack using at least one of deep learning analysis detection and machine learning and to generate a ransomware alert.

In other features, the ransomware remediator includes an alert handler configured to receive the ransomware alert from the ransomware detector. A database data changer is configured to change at least one of selected rows and selected tables in the database based upon the database backup data in response to the ransomware alert.

In other features, the database backup handler is configured to schedule snapshots of the database in response to at least one of an event or a predetermined backup period and to store the snapshots in the storage device. The database backup handler includes a backup data retriever configured to retrieve changed row data and to store the changed row data in the storage device. The database backup handler is configured to retrieve changes to a database log and to store the changes in the storage device.

A system for protecting a database against a ransomware attack includes a processor and memory. A ransomware detection and remediation application, stored in the memory and executed by the processor, is configured to: retrieve and store database backup data associated with a database to a storage device; monitor the database to detect data changes to the database resulting from a ransomware attack; and in response to the ransomware attack, restore data in the database to a point prior to the ransomware attack based upon the backup data in the storage device.

In other features, the ransomware detection and remediation application is further configured to receive database events from the database, and apply a plurality of rules to the database events to detect the ransomware attack. The ransomware detection and remediation application is further configured to detect the ransomware attack based on the database events using at least one of deep learning analysis detection and machine learning.

In other features, the ransomware detection and remediation application is further configured to receive ransomware alerts and change at least one of a row and a table in the database based upon the database backup data in response to the ransomware alerts.

In other features, the ransomware detection and remediation application is further configured to schedule snapshots of the database in response to at least one of an event or a predetermined backup period and to store the snapshots in the storage device. The ransomware detection and remediation application is further configured to retrieve changed row data and to store the changed row data in the storage device.

In other features, the ransomware detection and remediation application is further configured to retrieve changes to a database log and to store the changes in the storage device.

A method for protecting a database against a ransomware attack includes selectively outputting database backup data associated with a database to a storage device; monitoring changes to the database; detecting data changes to the database resulting from a ransomware attack; and in response to detecting the ransomware attack, restoring data in the database to a point prior to the ransomware attack based upon the backup data in the storage device.

In other features, the method includes receiving database events from the database and monitoring the database events using a plurality of rules to detect the ransomware attack and to generate a ransomware alert.

In other features, the method includes detecting the ransomware attack and generating the ransomware alert based on the database events using at least one of deep learning analysis detection and machine learning. The database backup data includes row changes made to the database and the method further comprises, in response to the ransomware alert, changing data in the database based upon the database backup data.

In other features, the database backup data includes snapshots of the database and the method further comprises restoring the database using the snapshots in response to the ransomware alerts. The database backup data includes a database log and the method further comprises restoring the database using the database log in response to the ransomware alerts.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

A ransomware detection and remediation system and method according to the present disclosure includes a ransomware detector that detects database data (such as data entries, rows or tables) that is altered by ransomware. Once the ransomware detector detects database that is affected by ransomware, a ransomware remediator returns the database to a state prior to a point when the ransomware affected the database data.

In some examples, a database backup handler periodically stores snapshots of database data such as data entries, rows and/or tables in the database. The ransomware remediator uses a snapshot taken prior to a time when the ransomware altered the database data. The snapshot is used to restore the ransomware altered data with backup data in the snapshot.

In other examples, the database application stores a log of changes to the database. The ransomware remediator uses the database log file (by reversing the changes) to return the database to a state prior to a time when the ransomware altered the database data.

In other examples, the database backup handler stores a file including chronological list of row changes that are made to the database. The ransomware remediator reverses the row changes to return the state of the database to a point that is prior to a time when the ransomware altered the database data. As a result, the database owner will have the option to remediate the altered database data without the need to pay a ransom.

As can be appreciated, the ransomware detector and the ransomware remediator can be implemented in a network in a variety of ways. In some examples, the database, the ransomware detector and the ransomware remediator are stored and executed, respectively, by the same computing device. In other examples, the database, the ransomware detector and the ransomware remediator are executed by two or more computing devices. In some examples, the database, the ransomware detector and the ransomware remediator are all implemented in a cloud network using one or more servers, virtual machines or containers. Alternately, the database, the ransomware detector and the ransomware remediator can be implemented in an enterprise network using one or more servers, virtual machines or containers.

Figure 1:
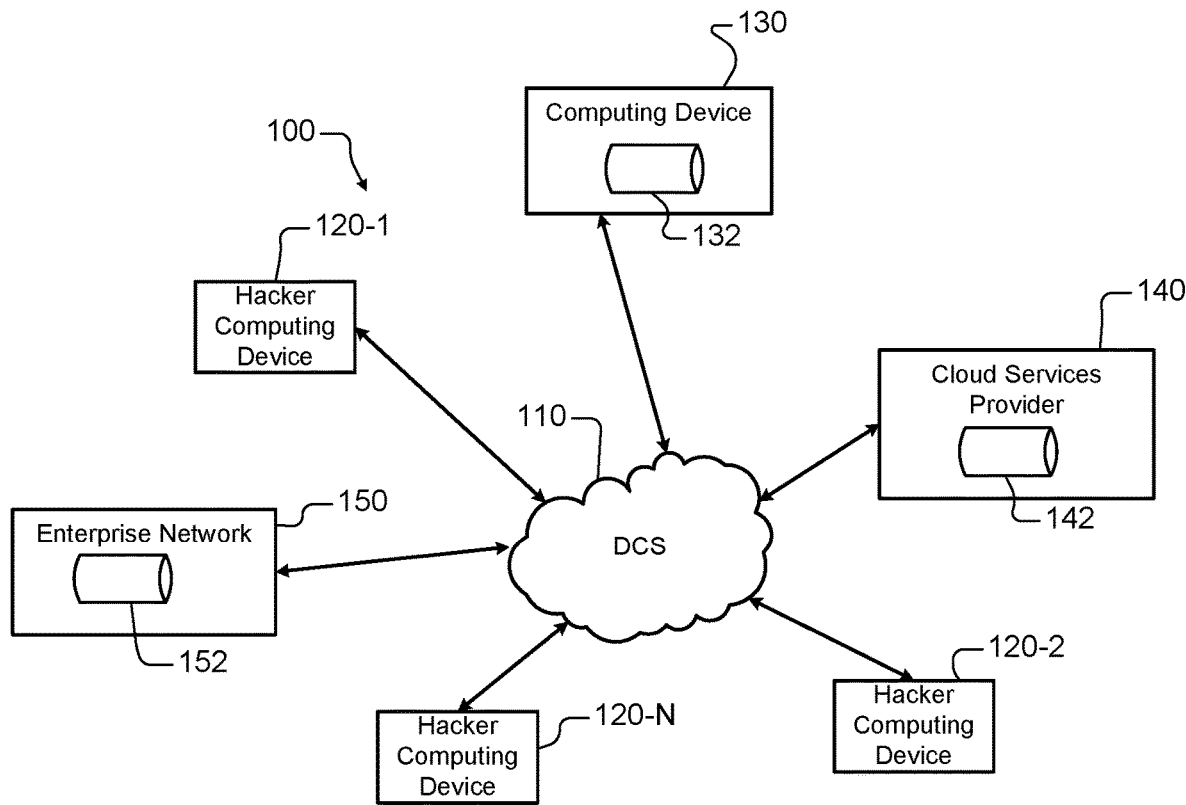
FIG. 1 is a functional block diagram of an example of a computer network according to the present disclosure.

Referring now to FIG. 1, one or more hacker computing devices 120-1, 120-2 . . . , and 120-N (collectively hacker computing devices or hackers 120) (where N is an integer greater than zero) in a network 100 are connected by a distributed communication system (DCS) 110 such as the Internet to one or more other computers. The hackers 120 attempt to install ransomware that may adversely affect data stored on databases (DB) of computing devices such as stand-alone computing devices or computing devices such as servers, virtual machines or containers associated with an on premises enterprise network or a cloud services provider.

For example, the network 100 may further include a computing device 130, a cloud services provider 140, and/or an enterprise network 150. The computing device 130 may be connected to one or more local or remote databases 132. The cloud services provider 140 may manage or is connected to one or more databases 142. The enterprise network 150 may manage or is connected to one or more local or remote databases 152. All of the databases are potential targets for ransomware attacks by the hackers 120.

Figure 2A:
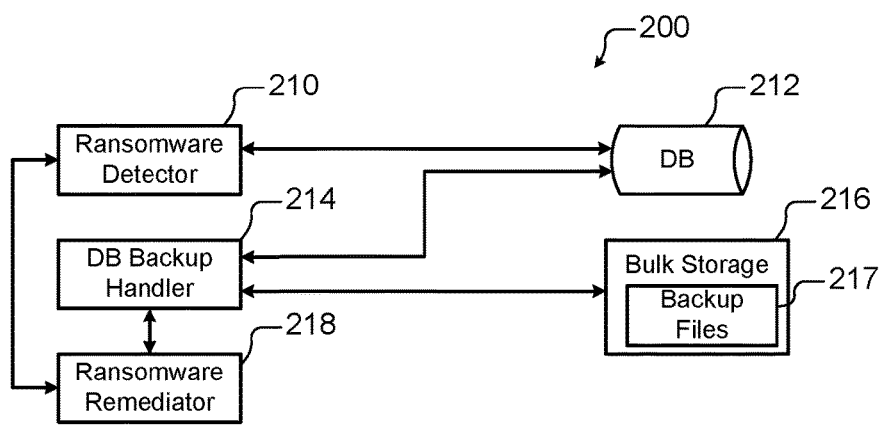
FIG. 2A is a functional block diagram of an example of a ransomware detector and remediator according to the present disclosure.

Referring now to FIG. 2A, a system 200 for detecting and remediating ransomware is shown to include a ransomware detector 210. The ransomware detector 210 detects data altered by ransomware in a database 212. In some examples, the ransomware detector 210 includes a software module or controller.

A database backup handler 214 selectively backs up portions of the database 212. In some examples, the database backup handler 214 includes a software module or controller. In some examples, the database backup handler 214 uses a snapshot feature of the database to store files 217 in bulk storage 216 such as a hard disk drive. When the ransomware detector 210 detects database data altered by the ransomware, the snapshots are used to return the database to a state prior to the ransomware attack. Alternately, the database backup handler 214 stores a chronological database log file of changes made to the database in the bulk storage 216.

In other examples, the database backup handler 214 stores row changes in chronological order in the bulk storage 216. In response to ransomware being detected by the ransomware detector 210, a ransomware remediator 218 uses the files 217 to restore the database to a time prior to the point where the ransomware altered the database data (for example by reversing the database changes). In some examples, the ransomware remediator includes a software module or controller. As can be appreciated, the locations of the ransomware detector 210, the database 212, the database backup handler 214, the bulk storage 216 and the ransomware remediator 218 will vary depending upon the architecture of the network.

Figure 2B:
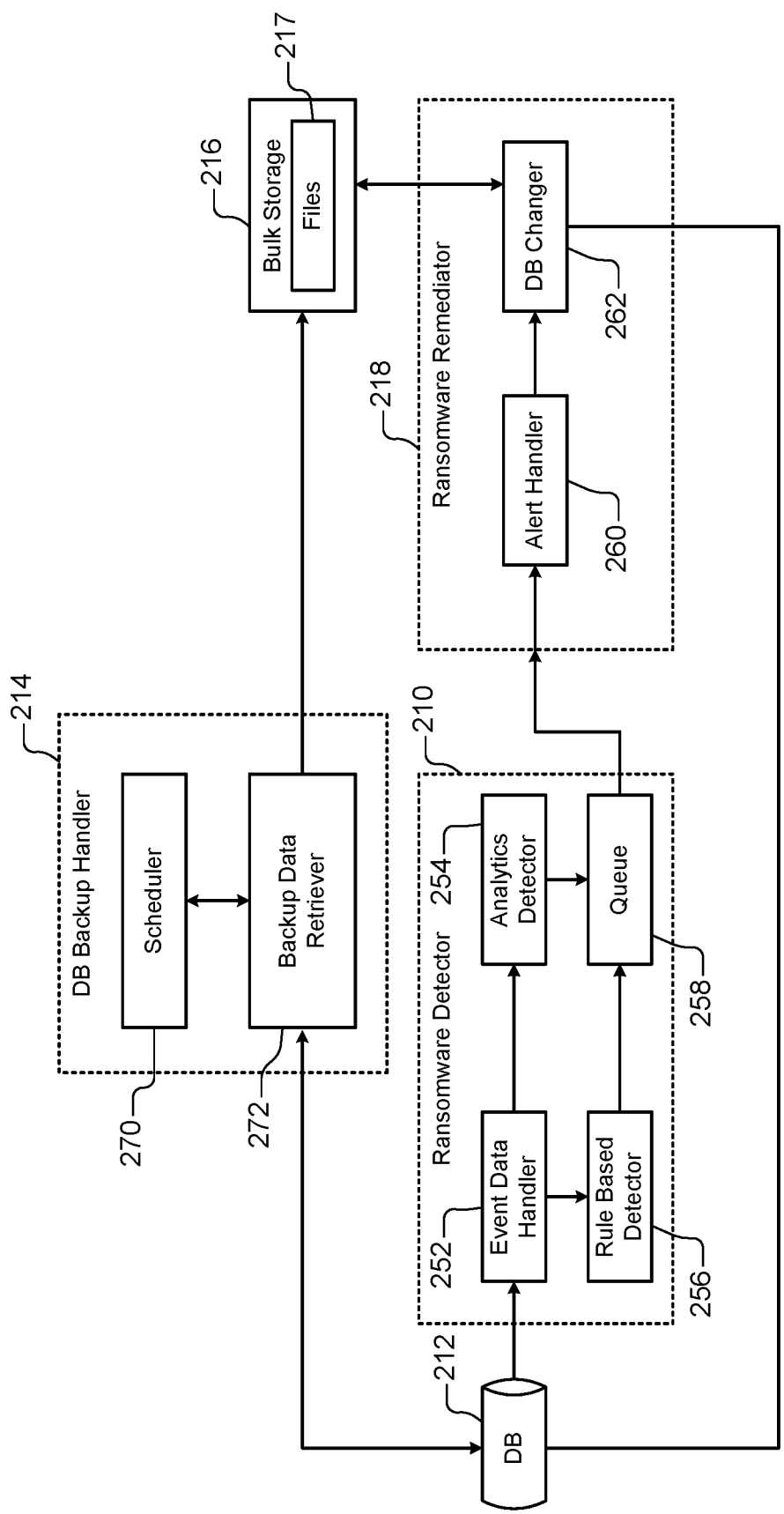
FIG. 2B is a functional block diagram of another example of a ransomware detector and remediator according to the present disclosure.

Referring now to FIG. 2B, the ransomware detector 210 may include an event data handler 252 that receives event data from the database 212 when events such as row updates or other database changes occur. In some examples, the event data handler 252 includes an event hub. The event data handler 252 outputs the event data to an analytics detector 254 and/or a rule-based detector 256. In some examples, the analytics detector 254 uses deep analysis detection, machine learning or other techniques described below to detect ransomware attacks on the data in the database 212. The rule-based detector 256 uses a set of rules to analyze the event data.

If a ransomware attack is detected, the analytics detector 254 and/or the rule-based detector 256 outputs a ransomware alert to a queue 258. The queue 258 outputs the ransomware alerts to an alert handler 260 associated with the ransomware remediator 218. The alert handler 260 coordinates with a database changer 262 to use the files 217 stored in the bulk storage 216 to restore the data by restoring the database back to a point before the ransomware attack occurred. The database backup handler 214 includes a backup scheduler 270 and a backup data retriever 272. The backup scheduler 270 may schedule backups on a periodic basis or an event basis. For example, the backup scheduler 270 may schedule backups in response to an event relating to unusual or atypical amount of changes being made to the database within a predetermined period. The backup data retriever 272 retrieves row changes, database log file changes or snapshots and stores them in the files 217.

In FIG. 3A, a computing device 290 such as a stand-alone computing device, or a server, virtual machine or container in an enterprise network or a cloud network is shown. The computing device 290 includes one or more processors 300 and memory 302. A host operating system 308 executes one or more user applications 312. In some examples, the computing device 290 may include an application 316 with a database interface to allow the application to send information to or retrieve information from a local or remote database or to set configuration parameters specifying backup intervals or notification preferences (or no notification and immediate remediation) in the event of a ransomware attack. In this example, some of the data in the database (stored remotely in the cloud or on a remote server) may be altered by ransomware and may need to be detected and corrected by the ransomware detector and the ransomware remediator described below. The computing device 290 further includes a wired or wireless interface 334 and bulk storage 338 such as a hard disk drive.

Figure 3:
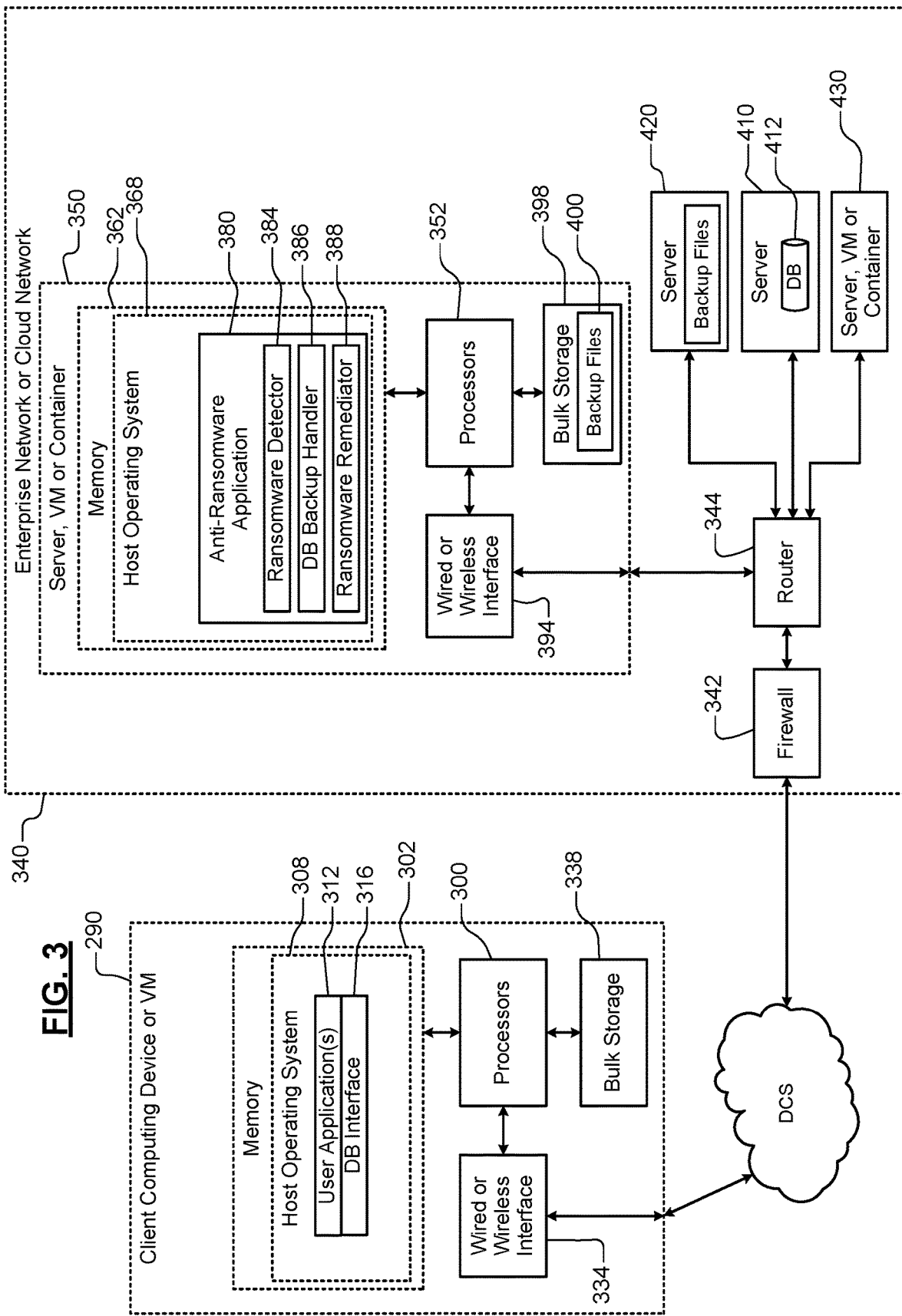
FIG. 3 is a functional block diagram of another example of a ransomware detector and remediator according to the present disclosure.

The computing device 290 communicates with a network 340 such as an enterprise network or cloud network (for example via the DCS, a firewall 342 and a router 344 shown in FIG. 3). A computing device 350 associated with the network 340 includes one or more processors 352 and memory 362. In some examples, the computing device 350 is a server, virtual machine or container in an enterprise network or a cloud network. The memory 362 includes a host operating system 368 and an anti-ransomware application 380. The anti-ransomware application includes a ransomware detector 384, a database backup handler 386 and a ransomware remediator 388, which can be implemented using software sub-modules. While the ransomware detector 384, the database backup handler 386 and the ransomware remediator 388 are shown on a single server, virtual machine or container, separate servers, virtual machines or containers can be used. The computing device 350 further includes a wired or wireless interface 394 and bulk storage 398. In some examples, the database backup data can be stored as files 400 in the bulk storage 398.

The computing device 350 communicates via the router 344 with a server 410 storing a database 412. The computing device 250 also communicates with one or more additional servers 420 and 430. In some examples, the servers 410 and/or 420 may be used to store the backup files.

Figure 4A:
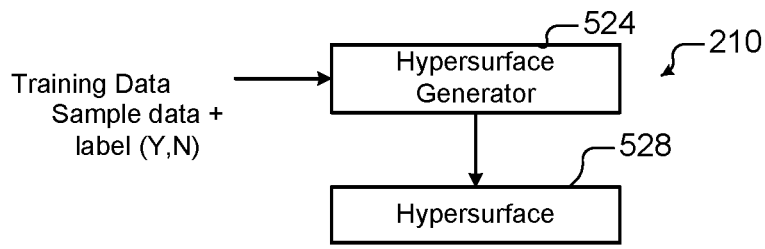
FIGS. 4A-4G are functional block diagrams illustrating additional examples of ransomware detectors according to the present disclosure.
Figure 4B:
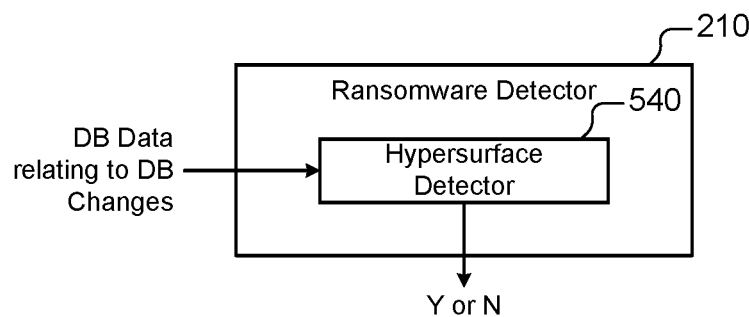

Referring now to FIGS. 4A-4G, various other examples of the ransomware detector 210 are shown. In FIG. 4A, a hypersurface generator 524 receives training data including sample data and a label identifying whether the data is ransomware or not. As will be described further below, the hypersurface generator 524 generates a hypersurface model 528 that is used in a hypersurface detector 540 in FIG. 4B.

Figure 4C:
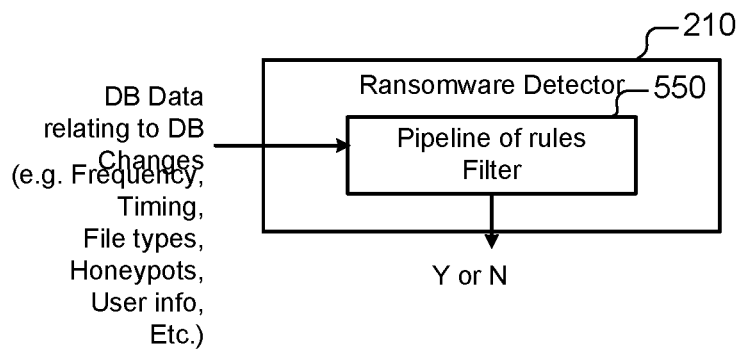

In other examples shown in FIG. 4C, the ransomware detector 210 includes a rules filter 550. The rules filter 550 includes one or more rules that are used to filter database data or database event data and to identify ransomware based upon changes in frequency, timing, file types, user profiles, packet data such as source, destination, etc., file extensions, and/or information, etc. For example, the rules filter 550 may look for changes to honeypot database data and/or changes to file extensions that are indicators of a ransomware attack, although other rules may be used.

Figure 4D:
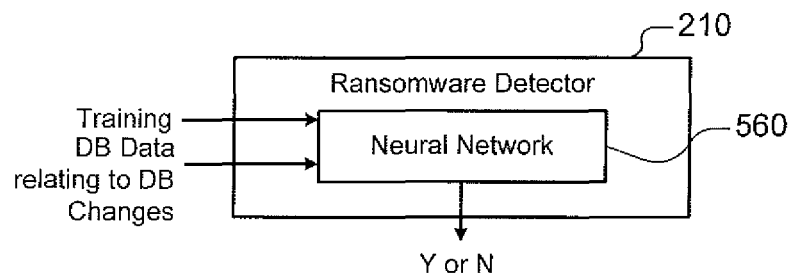

In FIG. 4D, the ransomware detector 210 includes a neural network 560 that is trained using known data. Once trained, the neural network 560 is used to identify ransomware.

Figure 4E:
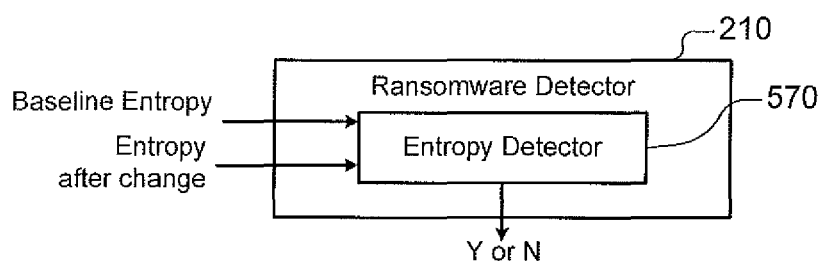

In FIG. 4E, the ransomware detector 210 includes an entropy detector 570. The entropy detector 570 measures the relative randomness of a data entry, row, column or table in the database and assigns a randomness level on a predetermined scale. For example, a table including unencrypted list of addresses and names would be relatively non-random whereas an encrypted table would be completely random. After a ransomware attack, the randomness of the table may increase as a result of encryption applied by the attacker.

Figure 4F:
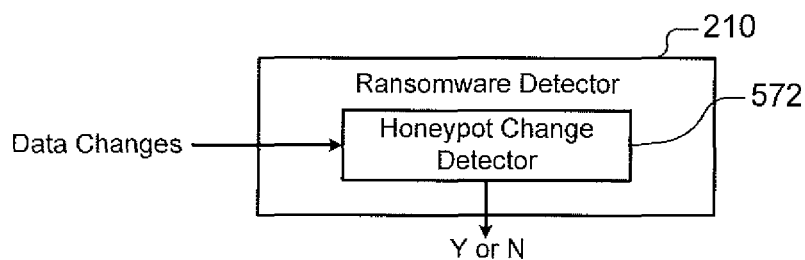

In FIG. 4F, a honeypot change detector 570 detects changes to honeypot database data such as data entries, rows, or tables. As can be appreciated, while specific examples are shown, other types of ransomware detectors are contemplated. In addition, two or more of the ransomware detection techniques described above and below can be used in combination.

Figure 4G:
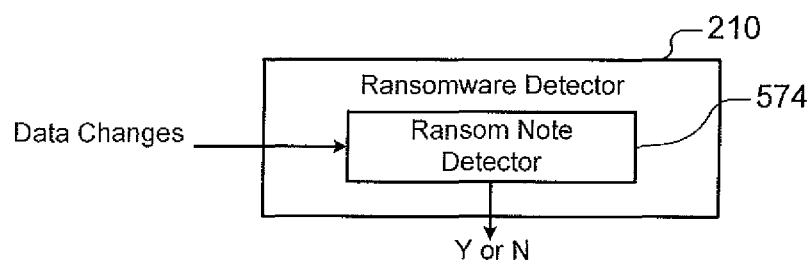

In FIG. 4G, the ransomware detector 210 includes a ransomware note detector 574 that detects a ransomware note in the changes to the data. In some examples, the ransom note may be sent by the hacker to the infected computing device. The note can be a, an email, a text file, an image file, a short messaging service (SMS), or any other form of communication. In some examples, the note is not sent to the infected device but rather is sent to another computing device such as one associated with the owner of the infected computing device. In some examples, the ransomware note detector 574 looks in the data changes for keyword terms such as requests for ransom, requests for bitcoins or other currency, and/or other terms that are typically used in ransom notes. In some examples, the ransomware note detector 574 uses image recognition, optical character recognition or cognitive analysis to detect the ransom note.

In some examples, the ransomware detector 210 may use data analytics to help distinguish between legitimate changes and malicious changes. The ransomware detector 210 may use various machine-learning techniques, such as a support vector machine, a Bayesian network, learning regression, a neural network, big data analytics, an evolutionary algorithm, and so on to detect malicious changes. The ransomware detector 210 may collect various features such as the number and frequency of changes, the location of changes, the patterns of the changes (extensions, headers, entropy changes, types), user information (e.g., organization or location), and so on. After collecting the features, the ransomware detector 210 may learn a classifier on a per-user basis, a per-organization basis, or on the basis of some other division of users. For example, the ransomware detector 210 may use various clustering techniques to generate clusters of users based on various attributes of the users (e.g., business user or personal user and frequency of computer usage).

In some examples, the ransomware detector 210 may employ a support vector machine to train classifiers for each user or each division of users. To train a classifier, the training data includes samples of malicious data changes and samples of legitimate data changes where each sample comprises a feature vector of features and a label indicating whether the sample represents a malicious or legitimate change. A support vector machine operates by finding a hypersurface in the space of possible inputs. The hypersurface attempts to split the positive examples (e.g., ransomware) from the negative samples (e.g., not ransomware) by maximizing the distance between the nearest of the positive and negative samples and the hypersurface.

A support vector machine simultaneously minimizes an empirical classification error and maximizes a geometric margin. This allows for correct classification of data that is similar to but not identical to the training data. Various techniques can be used to train a support vector machine. One technique uses a sequential minimal optimization algorithm that breaks the large quadratic programming problem down into a series of small quadratic programming problems that can be solved analytically. (See Platt, J., "Sequential Minimal Optimization: A Fast Algorithm for Training Support Vector Mechanisms," 1998, http://research.microsoft.com/pubs/69644/tr-98-14.pdf, which is Incorporated herein by reference in its entirety.)

A support vector machine is provided training data represented by $(x_i, y_i)$ where $x_i$ represents a feature vector and $y_i$ represents a label for sample i. A support vector machine may be used to optimize the following:

$$\min_{w,b,T} \frac{1}{2} w^T w + C \sum_{i=1}^{l} \xi_i$$

such that $y_i(w^T \phi(x_i) + b) \geq 1 - \xi_i, \xi_i \geq 0$ where vector w is perpendicular to the separating hypersurface, the offset variable b is used to increase the margin, the slack variable $\xi_i$ represents the degree of misclassification of $x_i$, the function $\phi$ maps the vector $x_i$ into a higher dimensional space, and C represents a penalty parameter of the error term. A support vector machine supports linear classification but can be adapted to perform nonlinear classification by modifying the kernel function, as represented by the following:

$$(K(x_i, x_j) = \phi(x_i)^T \phi(x_j))$$

In some examples, the ransomware detector uses a radial basis function ("RBF") kernel, as represented by the following:

$$K(x_i, x_j) = \exp(-y \|x_i - x_j\|^2), y > 0$$

The ransomware detector may also use a polynomial Gaussian RBF or a sigmoid kernel. The ransomware detector may use cross-validation and grid search to find optimal values for parameters y and C. (See Hsu, C. W., Chang, C. C., and Lin, C. J., "A Practical Guide to Support Vector Classification," Technical Report, Dept. of Computer Science and Information Engineering, National Taiwan University, Taipei, 2003, which is hereby Incorporated by reference in its entirety.)

In some examples, the ransomware detector inserts honeypot database data such as data entries, row entries or tables into the database being monitored. The honeypot database data is stored in the database solely for the purpose of detecting a malicious change to the honeypot database data. The user of the device may be unaware of the presence of the honeypot database data and would have no reason to change the content of the honeypot database data. For example, if the ransomware detector detects any change to the honeypot database data (or even a deletion of the honeypot database data), the ransomware detector may assume that the change was caused by ransomware and take remedial actions such as those described above. In some examples, the honeypot database data includes content that is similar to customer database data to help obscure detection by ransomware.

In some examples, the ransomware detector monitors changes to the honeypot database data, rather than behavior of an executing process (e.g., ransomware). The ransomware detector may factor in the entropy (e.g., Shannon entropy) of the honeypot database data because data affected by ransomware may have a high entropy output (e.g., as a result of encryption). The ransomware detector may also factor in variance in the honeypot database data because data affected by ransomware may have content that is completely dissimilar from its prior version. For example, the ransomware detector may employ a similarity-preserving hash function (e.g., Nilsimsa hash, TLSH, and Ssdeep) to detect changes. The ransomware detector may factor in the number of modifications to a honeypot database data because data affected by ransomware may be heavily modified. For example, the ransomware detector may monitor "magic marker" type modifications, extension changes, and/or content deletions.

Figure 5:
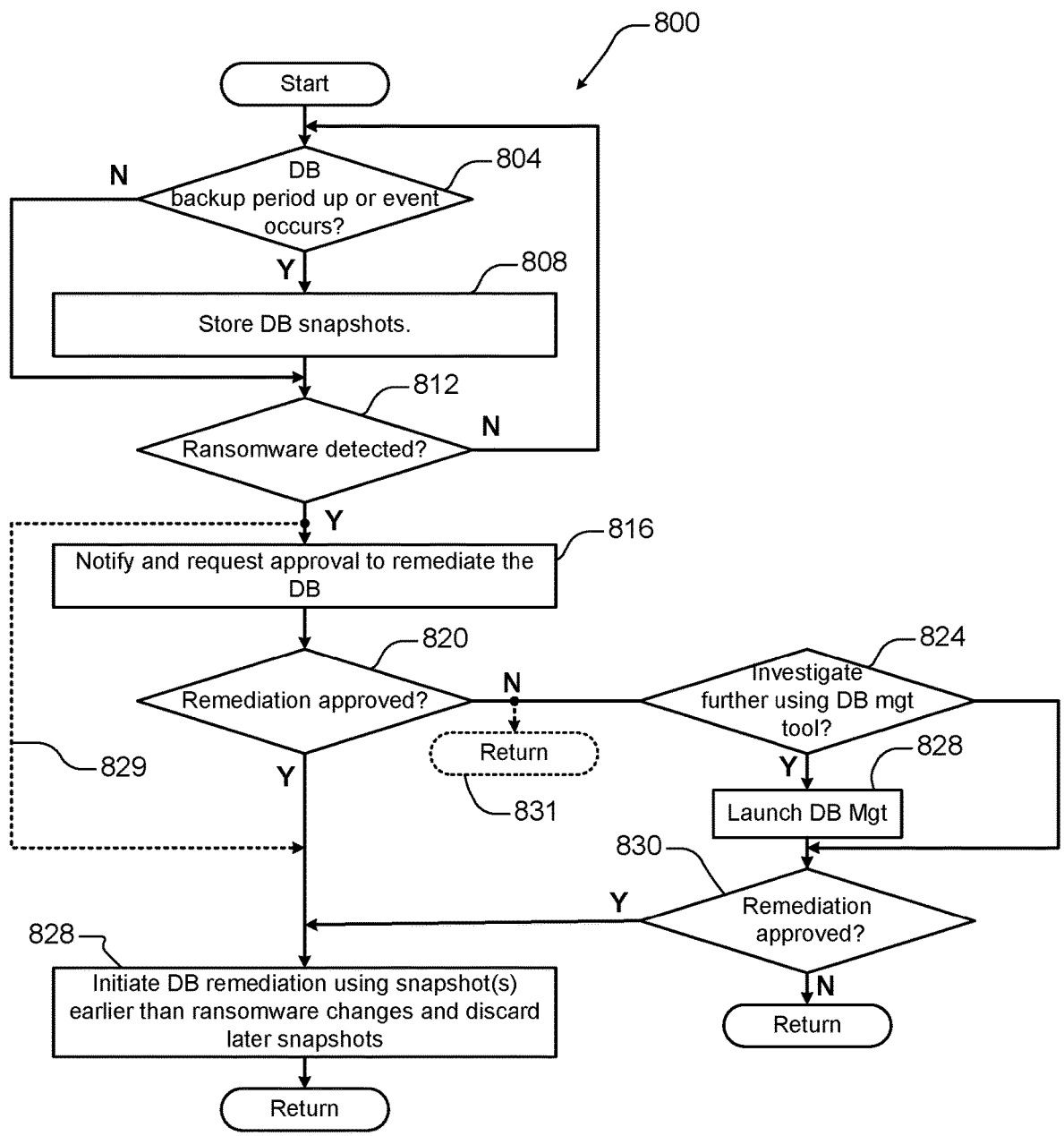
FIG. 5 is a flowchart illustrating ransomware detection and remediation using database snapshots according to the present disclosure.

Referring now to FIG. 5, a method 800 for detecting ransomware in a database and remediating the database to remove the effects of the ransomware is shown. At 804, the method determines whether a database backup period is up or an event occurs. For example, the backup period may be performed at a regular interval that can be shortened when unusual activity occurs in the database. When 804 is true, the database stores a snapshot of the database at 808. At 812, the method determines whether ransomware is detected. If not, the method returns to 804. When 812 is true, the method sends a message to a DB administrator to notify and request approval for remediation of the database at 816. If remediation is approved at 820, the method initiates the database remediation using snapshots that are earlier than the ransomware changes and overrides, deletes or renders obsolete later snapshots.

In some examples, the method proceeds from 812 when ransomware is detected to 828 without notifying and requesting approval for remediation as indicated at alternate path 829. If 820 is false, the method optionally returns at 831. Alternately, the method can continue from 820 to 824 where the method determines whether the database administrator or other user wants to further investigate the ransomware alert using a database management tool prior to initiating remediation. If 824 is true, the method continues at 828 and the database management tool is launched. After the investigation, the database administrator as allowed another opportunity to approve or disapprove of the database remediation at 830. If 830 is true, the method continues at 828. If 830 is false, the method returns.

Figure 6:
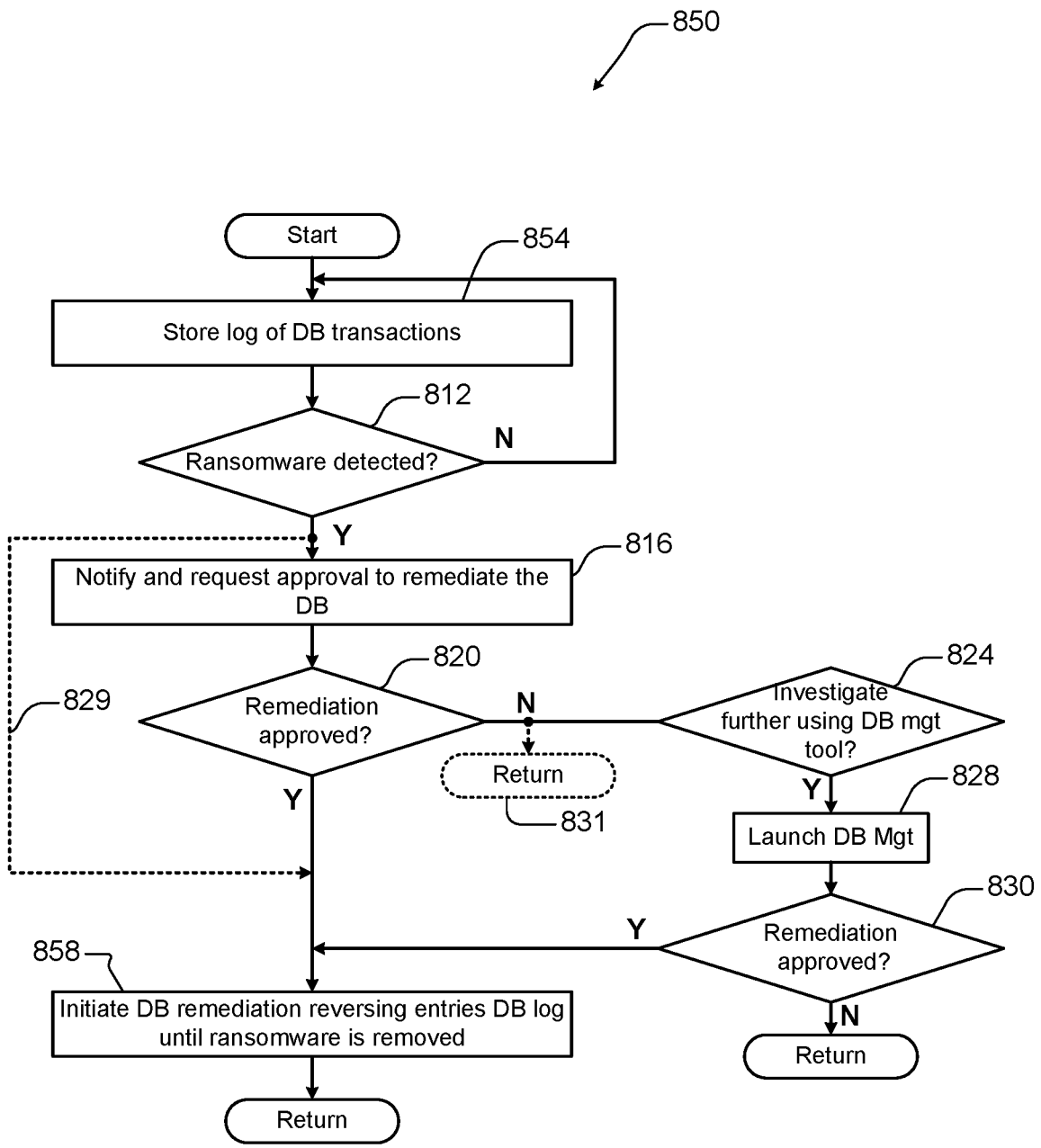
FIG. 6 is a flowchart illustrating ransomware detection and remediation using database log files according to the present disclosure.

Referring now to FIG. 6, a method 850 stores a log of database transactions at 854. When ransomware is detected, similar steps are performed. However, remediation is performed by reversing entries in the database log until the ransomware is removed at 858.

Figure 7:
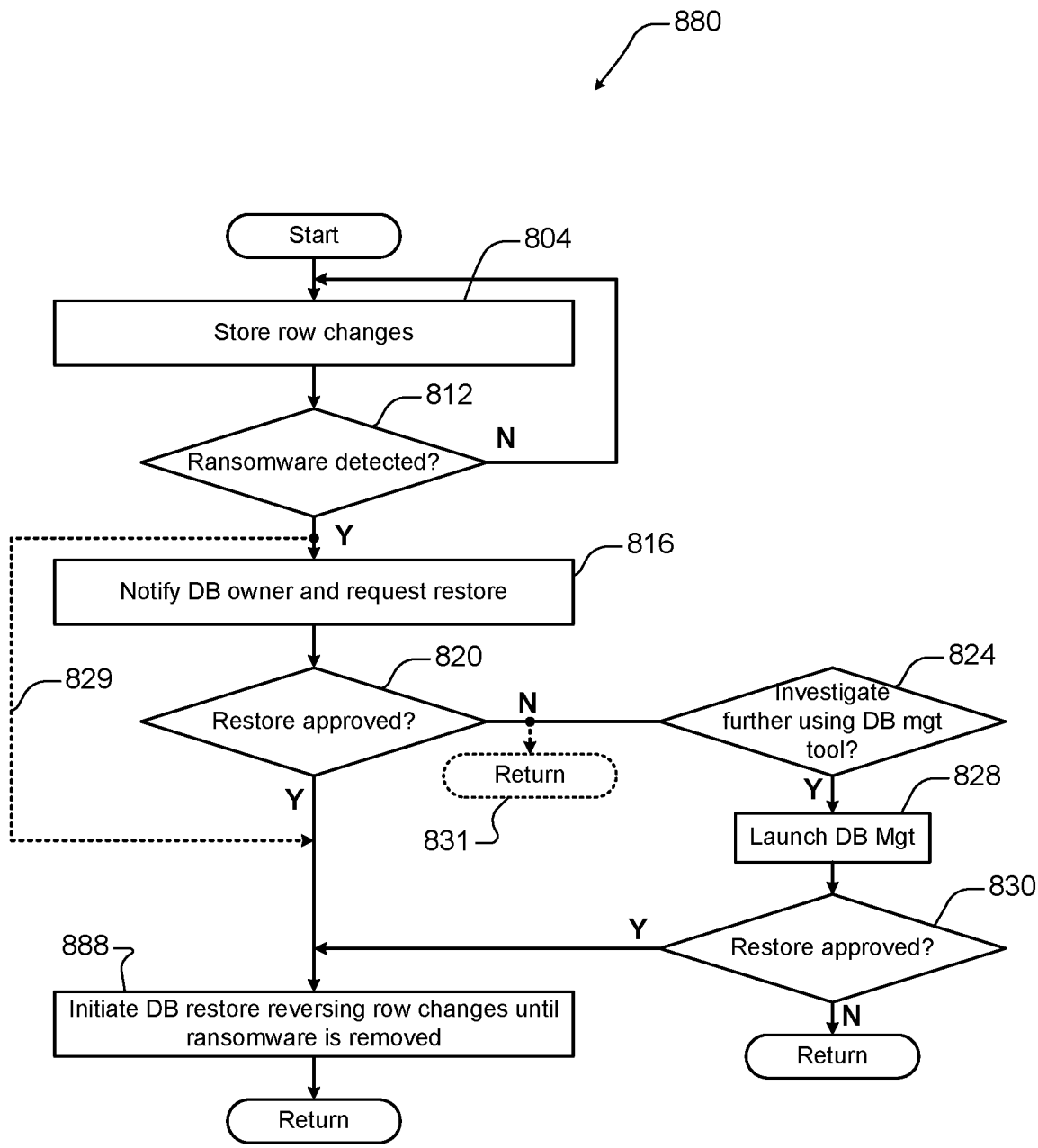
FIG. 7 is a flowchart illustrating ransomware detection and remediation using a database row changes according to the present disclosure.

Referring now to FIG. 7, a method 880 stores a row changes at 854. When ransomware is detected, similar steps are performed. However, remediation is performed by reversing row changes until the ransomware is removed at 888.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the examples is described above as having certain features, any one or more of those features described with respect to any example of the disclosure can be implemented in and/or combined with features of any of the other examples, even if that combination is not explicitly described. In other words, the described examples are not mutually exclusive, and permutations of one or more examples with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as JavaScript Object Notation (JSON), hypertext markup language (HTML) or extensible markup language (XML), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A network system for protecting a database under a condition in which a ransomware attack is potentially occurring, the network system comprising:
    one or more processor(s); and
    one or more hardware storage device(s) having stored thereon computer-executable instructions that are executable by the one or more processor(s) to cause the network system to at least:
        selectively output database backup data associated with a database to a storage device;
        detect data changes to the database, the data changes potentially occurring as a result of a ransomware attack, and wherein, under a condition in which the ransomware attack does affect the database, the database is considered to be stored on an infected computing device;
        detect the ransomware attack using (i) a plurality of rules used to filter database data in the database and (ii) at least one of deep learning analysis detection or machine learning, wherein detecting the ransomware attack is further performed by
            identifying a condition in which a ransomware note is on another non-infected computing device that is associated with an owner of the infected computing device;
        generate a ransomware alert in response to detecting the ransomware attack; and
        restore data in the database to a point prior to the ransomware attack based upon the database backup data in the storage device.

2. The network system of claim 1, wherein execution of the computer-executable instructions further causes the network system to:
    receive database events from the database; and
    use the plurality of rules to detect the ransomware attack and to generate the ransomware alert.

3. The network system of claim 1, wherein the ransomware alert is outputted to a queue.

4. The network system of claim 1, wherein execution of the computer-executable instructions further causes the network system to:
    in response to the ransomware alert, use the database backup data to change at least one of a selected row or a selected table in the database.

5. The network system of claim 1, wherein execution of the computer-executable instructions further causes the network system to schedule snapshots of the database in response to at least one of an event or a predetermined backup period and to store the snapshots in the storage device.

6. The network system of claim 1, wherein execution of the computer-executable instructions further causes the network system to retrieve changed row data from the database and to store the changed row data in the storage device.

7. The network system of claim 1, wherein execution of the computer-executable instructions further causes the network system to retrieve changes to a database log and to store the changes in the storage device.

8. The network system of claim 1, wherein detecting the ransomware attack further includes:
    inserting honeypot data into the database, the honeypot data including content that shares similarities to actual customer database data but that is not actual customer database data;
    monitoring changes to the honeypot data; and
    detecting entropy of the honeypot data due to an unauthorized modification of the honeypot data.

9. The network system of claim 1, wherein detecting the ransomware attack is further performed by determining a source and a destination for a packet of data being delivered to the infected network system.

10. A network system for protecting a database under a condition in which a ransomware attack is potentially occurring, the system comprising:
    a processor;
    memory;
    a ransomware detection and remediation application that is stored in the memory and executed by the processor and that is configured to:
        retrieve and store database backup data associated with a database to a storage device;
        detect data changes to the database, the data changes potentially occurring as a result of a ransomware attack, and wherein, under a condition in which the ransomware attack does affect the database, the database is considered to be stored on an infected computing device;
        detect the ransomware attack using (i) a plurality of rules used to filter database data in the database and (ii) at least one of deep learning analysis detection or machine learning, wherein detecting the ransomware attack is further performed by
            identifying a condition in which a ransomware note is on another non-infected computing device that is associated with an owner of the infected computing device;

generate a ransomware alert in response to detecting the ransomware attack; and in response to the ransomware attack, restore data in the database to a point prior to the ransomware attack based upon the database backup data in the storage device.

11. The network system of claim 10, wherein the ransomware detection and remediation application is further configured to:

receive database events from the database; and apply the plurality of rules to the database events to detect the ransomware attack.

12. The network system of claim 11, wherein the ransomware detection and remediation application is further configured to detect the ransomware attack based on the database events using at least one of the deep learning analysis detection or the machine learning.

13. The network system of claim 10, wherein the ransomware detection and remediation application is further configured to:

receive ransomware alerts; and change at least one of a row or a table in the database based upon the database backup data in response to the received ransomware alerts.

14. The network system of claim 10, wherein the ransomware detection and remediation application is further configured to schedule snapshots of the database in response to at least one of an event or a predetermined backup period and to store the snapshots in the storage device.

15. The network system of claim 10, wherein the ransomware detection and remediation application is further configured to retrieve changed row data and to store the changed row data in the storage device.

16. The network system of claim 10, wherein the ransomware detection and remediation application is further configured to retrieve changes to a database log and to store the changes in the storage device.

17. A method for protecting a database under a condition in which a ransomware attack is potentially occurring, the method comprising:

selectively outputting database backup data associated with a database to a storage device;

detecting data changes to the database, the data changes potentially occurring as a result of a ransomware attack, and wherein, under a condition in which the ransomware attack does affect the database, the database is considered to be stored on an infected computing device;

detecting the ransomware attack using (i) a plurality of rules used to filter database data in the database and (ii) at least one of deep learning analysis detection or machine learning, wherein detecting the ransomware attack is further performed by identifying a condition in which a ransomware note is on another non-infected computing device that is associated with an owner of the infected computing device;

generating a ransomware alert in response to detecting the ransomware attack; and in response to detecting the ransomware attack, restoring data in the database to a point prior to the ransomware attack based upon the database backup data in the storage device.

18. The method of claim 17, further comprising:

receiving database events from the database; and monitoring the database events using the plurality of rules to detect the ransomware attack and to generate the ransomware alert.

19. The method of claim 18, further comprising detecting the ransomware attack and generating the ransomware alert based on the database events using at least one of the deep learning analysis detection or the machine learning.

20. The method of claim 18, wherein the database backup data includes row changes made to the database and wherein the method further comprises, in response to the ransomware alert, changing data in the database based upon the database backup data.

21. The method of claim 17, wherein the database backup data includes snapshots of the database, and wherein the method further comprises restoring the database using the snapshots in response to the ransomware alert.

22. The method of claim 17, wherein the database backup data includes a database log, and wherein the method further comprises restoring the database using the database log in response to the ransomware alert.

* * * * *